(12) United States Patent
Gruenwald et al.

(10) Patent No.: US 11,525,482 B2
(45) Date of Patent: Dec. 13, 2022

(54) METHOD FOR PRODUCING A SHAFT-HUB CONNECTION, AND MOTOR VEHICLE SHAFT HAVING SUCH A CONNECTION

(71) Applicant: Bayerische Motoren Werke Aktiengesellschaft, Munich (DE)

(72) Inventors: Heinrich Gruenwald, Altdorf (DE); Anton Mangold, Hohenthann (DE); Stefan Schmiedel, Obersuessbach (DE); Armin Zeilner, Pfettrach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/045,056

(22) PCT Filed: Mar. 28, 2019

(86) PCT No.: PCT/EP2019/057908
§ 371 (c)(1),
(2) Date: Oct. 2, 2020

(87) PCT Pub. No.: WO2019/206556
PCT Pub. Date: Oct. 31, 2019

(65) Prior Publication Data
US 2021/0164523 A1 Jun. 3, 2021

(30) Foreign Application Priority Data
Apr. 27, 2018 (DE) ...................... 10 2018 206 536.5

(51) Int. Cl.
*F16D 1/072* (2006.01)
*F16D 1/10* (2006.01)
(52) U.S. Cl.
CPC ............... *F16D 1/072* (2013.01); *F16D 1/10* (2013.01); *F16D 2001/103* (2013.01)

(58) Field of Classification Search
CPC ...... F16B 11/002; F16B 17/004; F16D 1/027; F16D 1/064; F16D 1/072; F16D 1/10;
(Continued)

(56) References Cited

U.S. PATENT DOCUMENTS 2,257,008 A * 9/1941 Henn ........................ E04B 2/70
403/276
2,952,999 A * 9/1960 Glover .................... F16D 1/072
464/182

(Continued)

FOREIGN PATENT DOCUMENTS

CN 1678839 A 10/2005
CN 102287454 A * 12/2011 .............. F02C 7/277
(Continued)

OTHER PUBLICATIONS

Ishiide, Power Transmission Shaft and Manufacture Thereof, 1992, Google Patents Translation of JP 04140514 A (Year: 1992).*
(Continued)

*Primary Examiner* — Josh Skroupa
*Assistant Examiner* — Zachary A Hall
(74) *Attorney, Agent, or Firm* — Crowell & Moring LLP

(57) ABSTRACT

A method for producing a shaft-hub connection in which a shaft component and a hub component are placed into a joined state in the form of a frictional shaft-hub connection. The shaft component has a toothed region having teeth with a height H, and the hub component has a mating toothed region having a mating region internal diameter d. The hub component is pushed onto the shaft component in a longitudinal direction to produce the frictional shaft-hub connection and in the process geometrically reproduces the toothed region in the mating toothed region. The mating toothed region passes over a cylindrical centering region with an outer diameter D before coming into contact with the (Continued)

toothed region. The outer diameter D is at most 0.2 mm and at least 0.005 mm smaller than the mating region inner diameter d. The centering region has a length L greater than 1 mm.

7 Claims, 1 Drawing Sheet

(58) Field of Classification Search
CPC ............. F16D 2001/103; Y10T 403/49; Y10T 403/4949; Y10T 403/4966; Y10T 403/7026
USPC ............. 29/406, 525, 893.1, 893.33, 893.34, 29/893.32
See application file for complete search history.

(56) References Cited

U.S. PATENT DOCUMENTS

| | | | | |
|---|---|---|---|---|
| 3,055,100 | A * | 9/1962 | Kimpel | F16B 17/004 29/520 |
| 3,608,936 | A * | 9/1971 | Karden | F16B 21/12 403/9 |
| 3,642,311 | A * | 2/1972 | Edgemond, Jr. | F16B 17/004 403/282 |
| 4,561,799 | A * | 12/1985 | Arena | B21D 26/14 285/382.2 |
| 4,807,351 | A | 2/1989 | Berg et al. | |
| 4,820,241 | A * | 4/1989 | Nakamura | F16C 3/023 464/183 |
| 5,527,126 | A | 6/1996 | Digel et al. | |
| 5,647,683 | A * | 7/1997 | Easley | B60B 27/001 403/267 |
| 5,692,853 | A * | 12/1997 | Litz | F16B 17/004 29/419.2 |
| 6,315,487 | B1 * | 11/2001 | James | F16D 1/027 403/270 |
| 6,604,885 | B1 * | 8/2003 | Neuner | F16D 1/06 29/889.22 |
| 10,138,925 | B2 * | 11/2018 | Nakamura | F16C 3/026 |
| 2002/0041790 | A1 * | 4/2002 | Suzuki | F16D 3/387 403/280 |
| 2003/0040371 | A1 * | 2/2003 | Glowacki | F16D 1/02 464/183 |
| 2005/0254890 | A1 | 11/2005 | Schulz et al. | |
| 2007/0017313 | A1 * | 1/2007 | Pattok | F16B 17/004 74/388 PS |
| 2008/0028612 | A1 * | 2/2008 | Shirokoshi | F16D 1/072 29/893.1 |
| 2011/0012420 | A1 | 1/2011 | Nakagawa et al. | |
| 2012/0281941 | A1 | 11/2012 | Umekida et al. | |
| 2016/0084317 | A1 * | 3/2016 | Akita | F16C 3/023 464/162 |
| 2016/0136995 | A1 | 5/2016 | Nakagawa et al. | |
| 2016/0146281 | A1 * | 5/2016 | Pattok | F16D 1/10 267/273 |
| 2017/0070110 | A1 * | 3/2017 | Bilteryst | H02K 1/28 |
| 2018/0202497 | A1 * | 7/2018 | Lentini | F16D 3/185 |
| 2018/0231050 | A1 * | 8/2018 | Mikazuki | B60K 17/22 |

FOREIGN PATENT DOCUMENTS

| | | | |
|---|---|---|---|
| CN | 102666129 A | 9/2012 | |
| CN | 104786734 B | 6/2017 | |
| DE | 3401057 A1 * | 7/1984 | .......... F16H 53/025 |
| DE | 3732223 A1 * | 4/1988 | ............ F16D 1/072 |
| DE | 40 19 119 A1 | 1/1992 | |
| DE | 4023045 A1 * | 1/1992 | ............... B60S 1/04 |
| DE | 4042127 A1 * | 7/1992 | ............ F16D 1/096 |
| DE | 4335779 C1 * | 4/1995 | ............ F16B 17/006 |
| DE | 19542099 A1 * | 5/1997 | ............. F16C 3/023 |
| DE | 19853798 C1 * | 9/2000 | ............ F16D 1/072 |
| DE | 10137025 C1 * | 12/2002 | ............ F16D 1/072 |
| DE | 10239393 A1 * | 3/2004 | ............ F16D 1/072 |
| DE | 10302072 B3 * | 9/2004 | ............ B23P 11/025 |
| DE | 102005035281 A1 * | 2/2007 | ............ B23P 11/00 |
| DE | 10 2005 059 018 A1 | 6/2007 | |
| DE | 102007004212 A1 * | 9/2007 | ............ F16D 3/845 |
| DE | 102006034036 A1 * | 1/2008 | ......... B60B 27/0005 |
| DE | 10 2008 011 113 A1 | 8/2009 | |
| DE | 11 2009 000 811 T5 | 5/2011 | |
| DE | 102010020913 A1 * | 11/2011 | ............ F16B 11/002 |
| DE | 102012202455 A1 * | 8/2013 | ............ F16H 57/08 |
| DE | 102013220968 A1 * | 4/2014 | ............... F16D 1/10 |
| DE | 102014008719 B3 * | 7/2015 | ........... F16D 1/0829 |
| EP | 1760346 A2 * | 3/2007 | ............ F16D 1/072 |
| EP | 2333360 A2 * | 6/2011 | ............. F16D 3/387 |
| EP | 2916632 A1 * | 9/2015 | ........... H05K 5/0078 |
| FR | 2 663 096 A1 | 12/1991 | |
| FR | 2679304 A1 * | 1/1993 | ............... B60S 1/24 |
| FR | 2819562 A1 * | 7/2002 | ............ F16D 1/072 |
| GB | 2469524 A * | 10/2010 | ............... B62D 1/20 |
| JP | 04140514 A * | 5/1992 | ............ F16D 1/072 |
| JP | 06200951 A * | 7/1994 | ............ F16C 3/026 |
| JP | 2003225733 A * | 8/2003 | ............ B23P 11/00 |
| KR | 20070099715 A * | 10/2007 | ............... F16D 1/10 |
| WO | WO-9304903 A1 * | 3/1993 | ............ F16B 17/004 |
| WO | WO-9635885 A1 * | 11/1996 | ............ F16D 1/072 |
| WO | WO-0186161 A1 * | 11/2001 | ............ F16D 1/072 |
| WO | WO-03100278 A1 * | 12/2003 | ............ F16D 1/072 |
| WO | WO-2008025177 A1 * | 3/2008 | ............ F16C 3/026 |
| WO | WO-2013153826 A1 * | 10/2013 | ........... B62D 5/0409 |
| WO | WO-2014038096 A1 * | 3/2014 | ............... F16D 1/06 |
| WO | WO-2016166792 A1 * | 10/2016 | ............ F16D 1/072 |
| WO | WO-2018061618 A1 * | 4/2018 | ............. B21D 39/04 |
| WO | WO-2019027004 A1 * | 2/2019 | ............... B62D 1/19 |

OTHER PUBLICATIONS

Google Patent Translation of DE 10239393 A1. Friedrichshafen. Shaft-hub connection for transmission has boring with two adjacent sectors of different diameters. Mar. 11, 2004. (Year: 2004).*
International Search Report (PCT/ISA/210) issued in PCT Application No. PCT/EP2019/057908 dated Jul. 23, 2019 with English translation (four (4) pages).
German-language Written Opinion (PCT/ISA/237) issued in PCT Application No. PCT/EP2019/057908 dated Jul. 23, 2019 (five (5) pages).
German-language Office Action issued in German Application No. 10 2018 206 536.5 dated Apr. 1, 2019 (seven (7) pages).
Chinese-language Office Action issued in Chinese Application No. 201980018085.7 dated Jan. 6, 2022 with English translation (13 pages).
Chinese-language Office Action issued in Chinese Application No. 201980018085.7 dated Jun. 20, 2022 with English translation (13 pages).

* cited by examiner

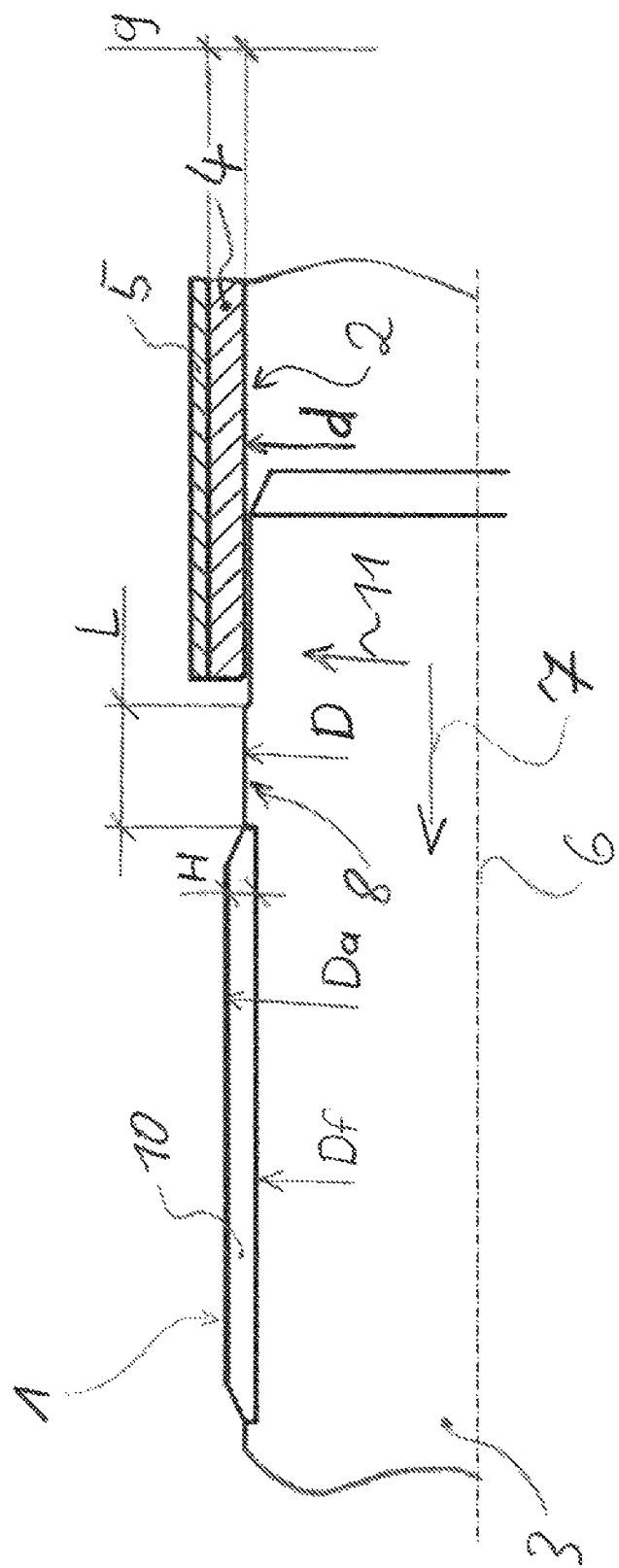

METHOD FOR PRODUCING A SHAFT-HUB CONNECTION, AND MOTOR VEHICLE SHAFT HAVING SUCH A CONNECTION

The invention relates to a method for producing a shaft-hub connection with a force-fitting and form-fitting or frictional shaft-hub connection and a motor vehicle shaft having such a shaft-hub connection, a so-called connected motor vehicle shaft. DE 10 2008 011 113 A1 discloses a shaft-hub connection according to the preamble of patent claim 1.

In motor vehicles, use is frequently made of shafts assembled from multiple part shafts for torque transmission or, in other cases, a component, preferably a motor vehicle shaft, is permanently connected to a further component for torque transmission, such connected components are connected by means of so-called shaft-hub connections and will be designated as a connected motor vehicle shaft below. DE 10 2008 011 113 A1 proposes a so-called knurled press fit for a connected motor vehicle shaft, in which two components are joined to each other by means of form-fitting or frictional connection and remain permanently connected.

It is an object of the invention to specify a method for producing a shaft-hub connection with a high load-bearing capacity, and a connected motor vehicle shaft produced by this method. This object is achieved by a method according to patent claim 1 and by a motor vehicle shaft produced by this method according to patent claim 4; developments of this invention that are to be preferred are the subject matter of the dependent claims.

The basic idea of the invention is in particular to specify a method for producing a force-fitting and form-fitting shaft-hub connection with little or no chip formation during the production thereof. In this connection, the terms "frictional" or "force-fitting and form-fitting" are used synonymously in relation to shaft-hub connections. Furthermore, the proposed shaft-hub connection can be used advantageously in torque-transmitting and connection-stabilizing components, in particular motor vehicle shafts and stabilizers or the like. More preferably, the proposed shaft-hub connection can be used advantageously in torque-transmitting and connection-stabilizing components in which a welding method for forming the connection, in particular for torque transmission, is not expedient.

The invention relates to a method for producing a shaft-hub connection for a connected motor vehicle shaft from a shaft component and a hub component. In this production method, the shaft component and the hub component are transferred from a non-joined state into a joined state. In this non-joined state, the shaft component and the hub component are not in contact with each other, and torque transmission from one to the other of the components is thus not made possible. In the joined state, the shaft component and hub component form a permanent frictional shaft-hub connection. The proposed shaft-hub connection is suitable in particular for classic shaft-hub connections, in which both the shaft component and the hub component consist of a steel or aluminum material. Furthermore, the proposed shaft-hub connection is also suitable in particular for so-called mixed connections with respect to the materials of the shaft and hub component.

In this sense, such a mixed connection is to be understood to be a shaft-hub connection in which the shaft and the hub component consist of different materials; in particular one of the two components (shaft component, hub component) has a steel material as a constituent or consists of the same, and the other component has an aluminum material as a constituent or consists of the same, or one of the two components has a steel or aluminum material as a constituent or consists of the same, and the other component has a plastic as a constituent or consists of the same. Preferably, this plastic is a fiber-reinforced plastic, preferably a so-called carbon fiber reinforced plastic (CFK). Mixed connections of this type are frequently formed by an adhesive method in known shaft-hub connections.

In the sense of the invention, a frictional shaft-hub connection is to be understood as a press connection, in particular with a knurled shaft, the advantages of which lie in a high static transmission capacity, temperature resistance and the low tolerance sensitivity with respect to pitch deviations with, at the same time, high security against rotation. To produce a connection, the shaft component is pressed axially into the hub component (pushing the shaft component or the hub component in a longitudinal direction). The shaft component is in particular formed at least substantially as a rotationally symmetrical component and has an axis of symmetry or rotation, around which the latter rotates or can be rotated during planned operation.

In the sense of the invention, the longitudinal direction is to be understood as a direction along the axis of symmetry or rotation of the shaft component.

The shaft component has a toothed region which, in particular, is applied to the shaft component by means of a material-removing or non-cutting fabrication method and preferably by so-called knurling.

The shaft component, which preferably has steel as a constituent or consists of the same, is pressed in the longitudinal direction with a radial overlap into a softer hub component, for example of aluminum, plastic or "soft" steel. Pressing the shaft component into the hub component leads to a toothed region of the hub component being toothed by a cutting or reshaping joining process, depending on the geometry of the toothed region of the shaft component. Furthermore, the strength, in particular the hardness, of the shaft component is greater in the toothed region than the strength, in particular the hardness, of the hub component in the mating toothed region, in order to permit this joining process.

Since the tool for producing the mating toothed region, in the present case the shaft component as a rule, and the joining part, which forms the shaft-hub connection with this mating toothed region, are identical, pitch deviations are ruled out by the principle. This leads to a load-bearing proportion of at least virtually 100% and a correspondingly high transmission capacity. Frictional shaft-hub connections of this type are known in principle from the prior art as so-called knurled press connections.

To form this frictional shaft-hub connection, the shaft component has the toothed region having teeth with a tooth height H; these teeth extend on the shaft component in the radial direction between a tooth foot diameter Df and a tooth tip diameter Da.

The hub component has a mating toothed region which is hollow-cylindrical, at least in some sections or completely, when in the non-joined state and has a mating region internal diameter d. The tooth tip diameter Da of the toothed region is greater than this mating region internal diameter d. To form a frictional shaft-hub connection, the hub component is pushed onto the shaft component in a longitudinal direction, in particular as longitudinally relative to an axis of symmetry of the toothed region. During this pushing action, the toothed region of the shaft component is geometrically reproduced in the mating toothed region of the hub component; the shaft and the hub component are therefore connected to each other with a frictional fit.

Investigations have shown that, during this pushing action in known shaft-hub connections, it is possible for teeth on the shaft and/or hub components to break out, so that the load-bearing capacity, in particular therefore the transmittable torque, is lower with this shaft-hub connection than in a connection without broken-out teeth. In order to reduce or preferably to avoid the teeth breaking out, when the hub component is pushed onto the shaft component, the mating toothed region passes over a cylindrical centering region before coming into contact with the toothed region. The cylindrical centering region has an outer centering diameter D. This outer centering diameter D is chosen such that it is at most 0.2 mm and at least 0.005 mm smaller than the mating region internal diameter d. Furthermore, the centering region has a longitudinal extent L in the longitudinal direction which is greater than 1 mm.

Furthermore, it is made possible for the centering region to be divided into several portions, which preferably have a cumulative length of 1 mm or are spaced apart at least 1 mm from one another and thus, in the sense of the invention, result in a length L of at least 1 mm. By means of this passing over of the centering region, better molding of the teeth in the mating toothed region and therefore a higher load-bearing capacity of the shaft-hub connection are achievable.

In a preferred embodiment of the invention, as the hub component is pushed onto the shaft component, the toothed region passes over the longitudinal extent L, wherein L is greater than or equal to 2 mm. In particular with such a longitudinal extent L, particularly good centering of the hub component with respect to the shaft component can be achieved, and thus the load-bearing capacity of the shaft-hub connection can be improved.

In a preferred embodiment of the invention, the outer centering diameter D is chosen in such a way that D is at least 0.005 mm and preferably at least 0.01 mm smaller than the mating region internal diameter d and, at most, D is 0.25 mm smaller than d and preferably is at most 0.1 mm smaller than d. In particular with such a choice of the diameters D and d, particularly good centering of the hub component with respect to the shaft component can be achieved, and thus the load-bearing capacity of the shaft-hub connection can be improved.

Furthermore, a connected motor vehicle shaft is provided, that is to say a component assembled from several elements which is provided for torque transmission in a motor vehicle, wherein this connected motor vehicle shaft has a shaft-hub connection which is fabricated by a production method of the aforementioned type. Such a connected motor vehicle shaft is distinguished by the fact that the teeth in the mating toothed region are shaped without cutting or virtually without cutting by the toothed region, and in addition there is no or only a low extent of occurrence of teeth breaking out within the toothed or mating toothed region.

In a preferred embodiment of the invention, the hub component in the region of the mating toothed region has a toothing wall thickness of 20 times H or less, preferably of 15 times H or less, and particularly preferably of 10 times H or less.

In the sense of the invention, the hub component in the region of the mating toothed region is formed, at least in some sections, as a tubular component having the so-called toothing wall thickness as wall thickness. During the formation of the teeth in the hub component in the mating toothed region, it is possible for radial forces to occur which can lead to deformation, in particular radial deformation, of the hub component in this region, in particular if the wall thickness of the hub component in the mating toothed region is low, wherein 20 times H or less is low in the sense of the invention.

In particular in order to avoid or at least to reduce this radial deformation, that is to say deformation orthogonal to the longitudinal direction, the hub component in the mating toothed region preferably has a supporting ring radially on the outside, which overlaps the mating toothing region completely or partly in the longitudinal direction and is attached thereto. Preferably, the supporting ring is attached to the hub component by means of a transition or press fit. The load-bearing capacity of the frictional shaft-hub connection can be improved in particular by such a supporting ring.

In a preferred embodiment of the invention, the toothed region of the shaft component has a tooth foot diameter Df, wherein Df is smaller than the centering diameter D. Investigations have shown that, with such a configuration, particularly good molding of the teeth in the mating toothed region of the hub component is achievable.

Individual features and embodiments of the invention are illustrated below by using the FIGURE, in which:

FIG. 1 shows a partial sectional illustration of a shaft and a hub component in the non-joined state.

In FIG. 1, the shaft component 3 is illustrated in partial section. Arranged on the shaft component 3 is the toothed region 1, which has a large number of teeth 10. These teeth 10 extend in the radial direction 11, that is to say respectively orthogonally with respect to the axis of symmetry 6, between the tooth foot diameter Df and the tooth tip diameter Da, and have the tooth height H. In planned operation, the shaft component 3 is rotatable about the axis of symmetry or rotation 6, in particular for torque transmission to the hub component 4.

In order that the teeth 10 can be reproduced in the initially hollow-cylindrical mating toothed region 2 during the fabrication, the toothed region 1 has a higher hardness, at least in the region of the teeth 10, than the mating toothed region 2. The supporting ring 5 is attached radially to the outside of the hub component 4. The supporting ring 5 prevents radial deformation of the hub component 4 as the teeth are molded in the mating toothed region 2. The toothing wall thickness 9 is low in relation to the tooth height H; therefore the hub component is reinforced by the supporting ring 5 in this region.

To form the frictional shaft-hub connection, the hub component 4 having the supporting ring 5 is pushed onto the shaft component 3 in the longitudinal direction 7 over the centering region 8 having the length L. In the process, the hub component 4 having the mating region internal diameter d firstly passes over the centering region 8 having the centering diameter D. As the centering region 8 passes over, the hub component 4 is aligned with the shaft component 3. As the hub component 4 is pushed further, the teeth 1 are reproduced in the mating toothed region 2, the shaft component 3 therefore likewise forms the tool for producing the toothing in the hub component 4 and also the joining part joined to this toothing, and in particular a high load-bearing capacity of this shaft-hub connection is achievable as a result.

LIST OF DESIGNATIONS

1 Toothed region
2 Mating toothed region
3 Shaft component

4 Hub component
5 Supporting ring
6 Axis of symmetry of the shaft and hub component
7 Longitudinal direction
8 Centering region
9 Toothing wall thickness
10 Teeth of 1
11 Radial direction
Df Foot diameter of 1
Da Tip diameter of 1
D Outer centering diameter
d Mating region internal diameter
L Longitudinal extent of 8

What is claimed is:

1. A method for producing a shaft-hub connection for a connected motor vehicle shaft from a shaft component and a hub component, comprising the acts of:

arranging a supporting ring radially to an outer side of the hub component in a hub mating toothed region such that the supporting ring overlaps the mating region completely or partly in a longitudinal direction; and after arranging the supporting ring on the hub component, transferring the shaft component and the hub component from a non-joined state into a joined state in which the shaft component and the hub component form a frictional shaft-hub connection, wherein an end of the shaft component has a toothed region having teeth with a tooth height H and the hub component has a mating toothed region which is hollow-cylindrical, at least in some sections or completely, when in the non-joined state and has a mating region internal diameter d, the transferring act includes pushing the hub component onto the shaft component in the longitudinal direction to produce the frictional shaft-hub connection and in the process geometrically reproducing the toothed region in the mating toothed region by shaping without cutting, when the hub component is pushed onto the shaft component, the mating toothed region passes over a cylindrical centering region of the shaft component having no toothing, the cylindrical centering region having an outer centering diameter D before coming into contact with the toothed region, the outer centering region diameter D is at most 0.2 mm and at least 0.005 mm smaller than the mating region internal diameter d, the centering region has a longitudinal extent L in the longitudinal direction which is greater than 1 mm, and the supporting ring overlaps the mating toothed region completely or partly in the longitudinal direction during the reproducing of the toothed region in the mating toothed region.

2. The method for producing a connected motor vehicle shaft according to claim 1, wherein L is greater than or equal to 2 mm.

3. The method for producing a connected motor vehicle shaft according to claim 1, wherein the outer centering region diameter D is at least 0.01 mm smaller than the mating region internal diameter d and the outer centering region diameter D is at most 0.1 mm smaller than the mating region internal diameter d.

4. A connected motor vehicle shaft produced by the method according to claim 3.

5. The connected motor vehicle shaft according to claim 4, wherein the hub component in the region of the mating toothed region has a toothing wall thickness, at least in some sections, of 20 times the tooth height H or less.

6. The connected motor vehicle shaft according to claim 5, wherein the toothed region has a tooth foot diameter Df which is smaller than the centering diameter D.

7. The connected motor vehicle shaft according to claim 4, wherein the toothed region has a tooth foot diameter Df is smaller than the centering diameter D.

\* \* \* \* \*